(12) United States Patent
Garg et al.

(10) Patent No.: US 12,393,883 B2
(45) Date of Patent: Aug. 19, 2025

(54) ADAPTIVELY SYNCHRONIZING LEARNING OF MULTIPLE LEARNING MODELS

(71) Applicant: Hewlett Packard Enterprise Development LP, Houston, TX (US)

(72) Inventors: Vishesh Garg, Bangalore Karnataka (IN); Sathyanarayanan Manamohan, Bangalore Karnataka (IN); Krishnaprasad Lingadahalli Shastry, Bangalore Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 1015 days.

(21) Appl. No.: 17/122,475

(22) Filed: Dec. 15, 2020

(65) Prior Publication Data

US 2021/0241183 A1 Aug. 5, 2021

(30) Foreign Application Priority Data

Jan. 31, 2020 (IN) .............................. 202041004375

(51) Int. Cl.
*G06N 20/20* (2019.01)
*G06F 9/38* (2018.01)
*G06F 17/18* (2006.01)

(52) U.S. Cl.
CPC ........... *G06N 20/20* (2019.01); *G06F 9/3891* (2013.01); *G06F 17/18* (2013.01)

(58) Field of Classification Search
None
See application file for complete search history.

(56) References Cited

U.S. PATENT DOCUMENTS

| | | | |
|---|---|---|---|
| 6,363,416 B1 * | 3/2002 | Naeimi | H04L 41/30 709/209 |
| 9,413,779 B2 | 8/2016 | Vasseur et al. | |

(Continued)

FOREIGN PATENT DOCUMENTS

| | | |
|---|---|---|
| AU | 2017100968 A4 | 9/2017 |
| CN | 105488675 A | 4/2016 |

(Continued)

OTHER PUBLICATIONS

"Decentralized Machine Learning White Paper", available online at <www.decentralizedml.com>, Dec. 31, 2017, 58 pages.

(Continued)

*Primary Examiner* — David R Vincent
(74) *Attorney, Agent, or Firm* — Hewlett Packard Enterprise Patent Department

(57) ABSTRACT

A system and a method for adaptively synchronizing learning of multiple learning models are disclosed. Several local learning models are executed on multiple nodes. Learning model parameters are shared by such nodes to a master node, in multiple iterations, after a predefined synchronization interval. Such learning model parameters are aggregated and central learning models are generated based on aggregated set of learning model parameters. Accuracies of the central learning models and an average accuracy of the central learning models are determined. Accuracy of an immediate central learning model i.e. the one received after determining the average accuracy, is compared with the average accuracy. Based on the difference between the accuracy of the immediate central learning model and the average accuracy, the synchronization interval is modified, and the multiple nodes are updated about this modified synchronization interval.

20 Claims, 5 Drawing Sheets

(56) References Cited

U.S. PATENT DOCUMENTS

| | | |
|---|---|---|
| 9,569,517 B1 | 2/2017 | Smola et al. |
| 9,633,315 B2 | 4/2017 | Chapelle et al. |
| 9,779,557 B2 | 10/2017 | Hauser et al. |
| 9,875,510 B1 | 1/2018 | Kasper |
| 10,057,243 B1 | 8/2018 | Kumar et al. |
| 10,360,500 B2 | 7/2019 | Kabul et al. |
| 10,547,679 B1 | 1/2020 | Burnett et al. |
| 10,671,435 B1 | 6/2020 | Gold et al. |
| 11,201,747 B2 | 12/2021 | Scherrer et al. |
| 11,334,817 B2 | 5/2022 | Wang et al. |
| 2012/0039473 A1 | 2/2012 | Gentry et al. |
| 2013/0290223 A1 | 10/2013 | Chapelle et al. |
| 2015/0193697 A1 | 7/2015 | Vasseur et al. |
| 2015/0324690 A1 | 11/2015 | Chilimbi et al. |
| 2015/0332283 A1 | 11/2015 | Witchey |
| 2015/0379072 A1 | 12/2015 | Dirac et al. |
| 2016/0087854 A1 | 3/2016 | Jayanti et al. |
| 2016/0179835 A1 | 6/2016 | Mika et al. |
| 2016/0217388 A1 | 7/2016 | Okanohara et al. |
| 2016/0261690 A1 | 9/2016 | Ford |
| 2016/0299918 A1 | 10/2016 | Ford |
| 2016/0335533 A1 | 11/2016 | Davis et al. |
| 2017/0060988 A1 | 3/2017 | Kudo et al. |
| 2017/0091397 A1 | 3/2017 | Shah |
| 2017/0103468 A1 | 4/2017 | Orsini et al. |
| 2017/0116693 A1 | 4/2017 | Rae et al. |
| 2017/0134158 A1 | 5/2017 | Pasol et al. |
| 2017/0140145 A1 | 5/2017 | Shah |
| 2017/0169358 A1 | 6/2017 | Choi et al. |
| 2017/0220949 A1 | 8/2017 | Feng et al. |
| 2017/0272342 A1 | 9/2017 | Zessin et al. |
| 2017/0279774 A1 | 9/2017 | Booz et al. |
| 2017/0289111 A1 | 10/2017 | Voell et al. |
| 2017/0302663 A1 | 10/2017 | Nainar et al. |
| 2018/0018590 A1 | 1/2018 | Szeto et al. |
| 2018/0039667 A1 | 2/2018 | Pierce et al. |
| 2018/0089683 A1 | 3/2018 | Setty et al. |
| 2018/0157688 A1 | 6/2018 | Zessin et al. |
| 2018/0183768 A1 | 6/2018 | Lobban et al. |
| 2018/0217905 A1 | 8/2018 | Reza et al. |
| 2018/0247191 A1 | 8/2018 | Katz et al. |
| 2018/0276626 A1 | 9/2018 | Laiben |
| 2018/0331897 A1 | 11/2018 | Zhang et al. |
| 2019/0020629 A1 | 1/2019 | Baird et al. |
| 2019/0042407 A1 | 2/2019 | Gao et al. |
| 2019/0089716 A1 | 3/2019 | Carsten |
| 2019/0138929 A1 | 5/2019 | Wong et al. |
| 2019/0147532 A1 | 5/2019 | Singh et al. |
| 2019/0182030 A1 | 6/2019 | Jo |
| 2019/0182231 A1 | 6/2019 | Harrer et al. |
| 2019/0236598 A1 | 8/2019 | Padmanabhan |
| 2019/0268284 A1 | 8/2019 | Karame et al. |
| 2019/0287026 A1 | 9/2019 | Calmon et al. |
| 2019/0295000 A1 | 9/2019 | Candel et al. |
| 2019/0317934 A1 | 10/2019 | Jentzsch et al. |
| 2019/0325432 A1 | 10/2019 | Ow et al. |
| 2019/0332921 A1 | 10/2019 | Rodriguez |
| 2019/0332955 A1 | 10/2019 | Manamohan et al. |
| 2019/0332966 A1 | 10/2019 | Gidney |
| 2019/0347540 A1 | 11/2019 | Yim et al. |
| 2020/0042362 A1 | 2/2020 | Cui et al. |
| 2020/0050494 A1 | 2/2020 | Bartfai-Walcott et al. |
| 2020/0057920 A1 | 2/2020 | Collins et al. |
| 2020/0193292 A1 | 6/2020 | Weng et al. |
| 2020/0218940 A1 | 7/2020 | Anglin et al. |
| 2020/0242511 A1* | 7/2020 | Kale ................ G06N 20/10 |
| 2020/0244435 A1 | 7/2020 | Shpurov et al. |
| 2020/0272845 A1* | 8/2020 | He .............. G06F 18/24133 |
| 2020/0311617 A1* | 10/2020 | Swan ............... G06F 9/45558 |
| 2020/0348662 A1 | 11/2020 | Cella et al. |
| 2021/0019630 A1* | 1/2021 | Yao ..................... G06N 3/045 |
| 2021/0134095 A1 | 5/2021 | Milt et al. |
| 2021/0287080 A1* | 9/2021 | Moloney ............. G06N 3/098 |
| 2022/0261634 A1* | 8/2022 | Liu ..................... G06N 3/045 |
| 2022/0344060 A1* | 10/2022 | Kristal ................. G16H 50/50 |
| 2023/0010095 A1* | 1/2023 | Alabbasi ............ H04L 41/145 |
| 2023/0041118 A1 | 2/2023 | Imabayashi et al. |

FOREIGN PATENT DOCUMENTS

| | | |
|---|---|---|
| CN | 106228446 A | 12/2016 |
| CN | 106445711 A | 2/2017 |
| CN | 106656798 A | 5/2017 |
| CN | 106911513 A | 6/2017 |
| CN | 107103087 A | 8/2017 |
| CN | 107332900 A | 11/2017 |
| CN | 107395349 A | 11/2017 |
| CN | 107395353 A | 11/2017 |
| CN | 107579848 | 1/2018 |
| CN | 107656832 A | 2/2018 |
| CN | 107665154 A | 2/2018 |
| CN | 107864198 A | 3/2018 |
| CN | 107967539 A | 4/2018 |
| CN | 108268638 A | 7/2018 |
| CN | 109033757 A | 12/2018 |
| CN | 109685501 A | 4/2019 |
| CN | 109889326 A | 6/2019 |
| CN | 110428056 A | 11/2019 |
| CN | 110472745 A | 11/2019 |
| CN | 110490305 A | 11/2019 |
| CN | 110490330 A | 11/2019 |
| CN | 105488675 B | 12/2019 |
| EP | 3564873 A1 | 11/2019 |
| GB | 2559592 A | 8/2018 |
| WO | 2017/203093 A1 | 11/2017 |
| WO | 2018/059939 A1 | 4/2018 |
| WO | 2018/130267 A1 | 7/2018 |
| WO | 2018/191030 A1 | 10/2018 |

OTHER PUBLICATIONS

Diro et al., "Deep Learning: The Frontier for Distributed Attack Detention in Fog-to-Things Computing", IEEE Communications Magazine, Feb. 2018, , pp. 169-175.

Acar et al., "A Survey on Homomorphic Encryption Schemes: Theory and Implementation", ACM Computing Surveys, vol. 51, No. 4, Article 79, Jul. 2018, pp. 79:1-79:35.

Bonawitz et al., "Practical Secure Aggregation for Privacy-Preserving Machine Learning", Cryptology ePrint Archive: Report 2017/281, 2017, 21 pages.

Kurakin et al., "Adversarial Examples in the Physical World", CoRR, abs/1607.02533, 2017, pp. 1-14.

Nedic et al., "Network Topology and Communication-Computation Tradeoffs in Decentralized Optimization", Jan. 15, 2018, 32 pages.

Shokri et al., "Membership Inference Attacks Against Machine Learning Models", CoRR, abs/1610.05820, 2017, 16 pages.

Yuan et al., "Privacy Preserving Back-Propagation Neural Network Learning Made Practical with Cloud Computing", IEEE Transactions on Parallel and Distributed Systems, 2013, vol. 25, pp. 1-11.

Reisizadeh et al., "Robust and Communication-Efficient Collaborative Learning", Oct. 31, 2019, 33 pages.

Teerapittayanon et al., "DaiMON: a Decentralized Artificial Intelligence Model Network", Jul. 2019, 8 pages.

Resizadeh, et al., "Quantized Decentralized Consensus Optimization"; 2018 IEEE Conference on Decision and Control (CDC) (Year: 2018).

Zhu, et al., Blockchain-Based Privacy Preserving Deep Learning. In: Guo, F., Huang, X., Yung, M. (eds) Information Security and Cryptology. Inscrypt 2018. Lecture Notes in Computer Science( ), vol. 1144 (Year: 2018).

M. Shen, X. Tang, L. Zhu, X. Du and M. Guizani, "Privacy-Preserving Support Vector Machine Training Over Blockchain-Based Encrypted IoT Data in Smart Cities," in IEEE Internet of Things Journal, vol. 6, No. 5, pp. 7702-7712, Oct. 2019, doi: 10.1109/JIOT.2019.2901840. (Year: 2019).

Search Report and Written Opinion received for PCT Application No. PCT/US2021/013394, mailed on Apr. 19, 2021, 08 pages.

(56) References Cited

OTHER PUBLICATIONS

Kate et al, "Distributed Key Generation in the Wild", Report 2012/377, 2012, pp. 1-30.
Xu et al., "HybridAlpha: an Efficient Approach for Privacy-Preserving Federated Learning", ACM, 2019, 11 pages.
Watanabe et al, "Blockchain contract: a complete consensus using blockchain," 2015 IEEE 4th Global Conference on Consumer Electronics (GCCE), 2015, pp. 577-578, doi: 10.1109/GCCE.2015. 7398721. (Year: 2015).
Yang et al. "Federated Machine Learning: Concept and Applications." arXiv preprint arXiv:1902.04885 (2019). (Year: 2019).
European Search Report and Search Opinion received for EP Application No. 21747157.2, mailed on Oct. 28, 2022, 5 pages.
Li et al., "DLBC: a Deep Learning-Based Consensus in Blockchains for Deep Learning Services", IEEE Transactions on Services Computing, Jan. 31, 2020, 13 pages.
Lihu et al., "A Proof of Useful Work for Artificial Intelligence on the Blockchain", Jan. 25, 2020, 25 pages.
Xu, R., et al., "HybridAlpha: an Efficient Approach for Privacy-Preserving Federated Learning", ACM, Nov. 11, 2019, pp. 11.
Abadi et al., "TensorFlow: a System for Large-Scale Machine Learning", 2th USENIX Symposium on Operating Systems Design and Implementation (OSDI '16), Nov. 2-4, 2016, 21 pages.
Ali et al., "Applications of Blockchains in the Internet of Things: a Comprehensive Survey", IEEE Communications Surveys & Tutorials, 2018, 42 pages.
Bank for International Settlements, "Distributed ledger technology in payment, clearing and settlement", Committee on Payments and Market Infrastructures, Feb. 2017, 29 pages.
Ben Dickson, "The case for decentralized artificial intelligence", TechTalks, available online at <https://bdtechtalks.com/2018/01/10/decentralized-ai-blockchain/>, Jan. 10, 2018, 5 pages.
Bonawitz et al., "Practical Secure Aggregation for Privacy-Preserving Machine Learning", CCS'17, ACM, Oct. 30-Nov. 3, 2017, pp. 1175-1191.
Catherine Sturman, "OWKIN is set to use machine learning to augment medical and biology research", Healthcare Global, available online at <https://www.healthcareglobal.com/technology/owkin-set-use-machine-learning-augment-medical-and-biology-research>, Jun. 19, 2018, 8 pages.
Chen et al., "ALGORAND", Computer Science Cryptography and Security, May 26, 2017, pp. 1-75.
Chen et al., "When Machine Learning Meets Blockchain: a Decentralized, Privacy-preserving and Secure Design", IEEE International Conference on Big Data (Big Data), 2018, pp. 1178-1187.
Extended European Search Report received for EP Patent Application No. 18177565.1, mailed on Nov. 30, 2018, 08 pages.
Extended European Search Report received for EP Patent Application No. 18177566.9, mailed on Dec. 13, 2018, 07 pages.
Extended European Search Report received for EP Patent Application No. 18183265.0, mailed on Feb. 4, 2019, 11 pages ..
Fred Ehrsam, "Blockchain-based Machine Learning Marketplaces", Medium, available online at <https://medium.com/@FEhrsam/blockchain-based-machine-learning-marketplaces-cb2d4dae2c17>, Mar. 13, 2018, 10 pages.
Georgopoulos et al., "Distributed machine learning in networks by consensus", Neurocomputing, Elsevier, vol. 124, 2013, 11 pages.
Kim et al., "On-Device Federated Learning via Blockchain and its Latency Analysis", Research Gate, Aug. 2018, 4 pages.
Kurtulmus et al., "Trustless Machine Learning Contracts; Evaluating and Exchanging Machine Learning Models on the Ethereum Blockchain", Research Gate, Feb. 27, 2018, 11 pages.
Lei Shi, "The convergence of AI and IoT, are we there yet?", available online at <https://northstream.se/insights/blog/the-convergence-of-ai-and-iot-are-we-there-yet/>, Oct. 11, 2017, 11 pages.
Li et al., "Scaling Distributed Machine Learning with the Parameter Server", 11th USENIX Symposium on Operating Systems Design and Implementation, Oct. 6-8, 2014, 17 pages.
Mendis et al., "Blockchain as a Service: an Autonomous, Privacy Preserving, Decentralized Architecture for Deep Learning", Research Paper, Jul. 5, 2018, pp. 1-8.
Nakamoto et al., "Bitcoin: a Peer-to-Peer Electronic Cash System", Oct. 31, 2008, pp. 1-9.
Pop at al., "Blockchain Based Decentralized Management of Demand Response Programs in Smart Energy Grids", MDPI, Jan. 9, 2018, pp. 1-21.
Sandha et al., "In-database Distributed Machine Learning: Demonstration Using Teradata SQL Engine," Proceedings of the VLDB Endowment, vol. 12, No. 12., Aug. 2019, pp. 1854-1857.
Search Report and Written Opinion received for PCT Application No. PCT/US2020/019064, mailed on Jun. 2, 2020, 15 pages.
Singla et al.., "Machine Learning for Secure Device Personalization Using Blockchain", IEEE, Sep. 19, 2018, 7 pages.
Venkataraman et al., "Adopting blockchain for enterprise asset management (EAM)", IBM, available online at <https://developer.ibm.com/technologies/blockchain/tutorials/cl-adopting-blockchain-for-enterprise-asset-management-eam/>, Mar. 17, 2017, 15 pages.
Verbraeken et al., A Survey on Distributed Machine Learning, (Research Paper), ACM Computing Surveys, vol. 53, No. 2, Mar. 2020, pp. 1-33.
Weng et al., "DeepChain: Auditable and Privacy-Preserving Deep Learning with Blockchain-based Incentive", Journal of Latex Class Files, vol. 14(8), Nov. 2019, pp. 1-18.
Zhang et al., "Stay Fresh: Speculative Synchronization for Fast Distributed Machine Learning", 2018 IEEE 38th International Conference on Distributed Computing Systems (ICDCS), 2018, 11 pages.
Search Report and Written Opinion received for PCT Application No. PCT/US2021/014932, mailed on May 13, 2021, 08 pages.
Castro et al, "Practical Byzantine Fault Tolerance", Proceedings of the Third Symposium on Operating Systems Design and Implementation, New Orleans, USA, Feb. 1999 (Year: 1999).
Chen et al, "On Security Analysis of Proof-of-Elapsed-Time (PoET)", In: Spirakis, P., Tsigas, P. (eds) Stabilization, Safety, and Security of Distributed Systems. SSS 2017. Lecture Notes in Computer Science( ), vol. 10616. Springer, Cham, https://doi.org/10.1007/978-3-319-69084-1_19 (Year: 2017).
Feng et al, "Scalable Dynamic Multi-Agent Practical Byzantine Fault-Tolerant Consensus in Permissioned Blockchain". Appl. Sci. 2018, 8, 1919. https://doi.org/10.3390/app8101919 (Year: 2018).
Nguyen et al, "A Survey about Consensus Algorithms Used in Blockchain", J Inf Process Syst, vol. 14, No. 1, pp. 101-128, Feb. 2018 https://doi.org/10.3745/JIPS.01.0024 (Year: 2018).
Yuguang et al., "Review and Research for Consensus Mechanism of Block Chain", China Academic Journal Electronic Publishing House, Research Papers, vol. 4, No. 4, Apr. 2018, pp. 369-379. (English Abstract Only).
860/Towards-Fair-and-Privacy-Preserving-Federated-Deep-Models. pdf (Year: 2020).
Lyu, Lingjuan et al. "Toward Fair and Decentralized Privacy-Preserving Deep Learning with Blockchain" Jun. 4, 2019 [Online] Downloaded Sep. 25, 2024 https://www.researchgate.net/profile/Xingjun-Ma/publication/333617529_Towards_Fair_and_Privacy-Preserving_Federated_Deep_Models/links/5d159dc9299bf1547c84 (Year: 2019).
Tran, Nguyen H. et al "Federated Learning over Wireless Networks: Optimization Model Design and Analysis" May 2019 [ONline] Downloaded Sep. 25, 2024 https://ieeexplore.ieee.org/stamp/stamp. jsp?tp=&arnumber=8737464 (Year: 2019).
Bano, Shehar et al. "SoK: Consensus in the Age of Blockchains" 2017, pp. 1-17.
Invidia, Lorenzo et al. "An IoT-oriented Fast Prototyping Platform for BLE-based Star Topology Networks", Journal of Communications Software and Systems, vol. 15, No. 2, Jun. 2019, pp. 138-149.

\* cited by examiner

ADAPTIVELY SYNCHRONIZING LEARNING OF MULTIPLE LEARNING MODELS

BACKGROUND

Machine learning techniques are known to utilize algorithms and statistical models for performing specific tasks without requiring explicit program instructions defining the specific tasks required to be done. Rather, the machine learning techniques learn patterns and inferences of the tasks performed in the past to develop a data model. Such data model predicts the tasks to be performed and manner of performing the tasks. A quantity of data required to develop such data model is very large. Therefore, enormous processing capability is required to process such large amount of data, to develop the data model. Further, accuracy of a developed data model is directly related to the quantity of data used for learning and the time spent on such learning.

In order to reduce the processing burden on a hardware, multiple data models are often prepared in parallel over distributed and/or decentralized environments. By preparing the data models in parallel over the distributed and/or decentralized environments, the processing burden of a single processing node gets distributed over multiple processing nodes. A final data model is prepared by merging of the data models prepared separately over the multiple nodes.

BRIEF DESCRIPTION OF THE ACCOMPANYING DRAWINGS

The accompanying drawings illustrate various embodiments of systems, devices, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Figure 1:
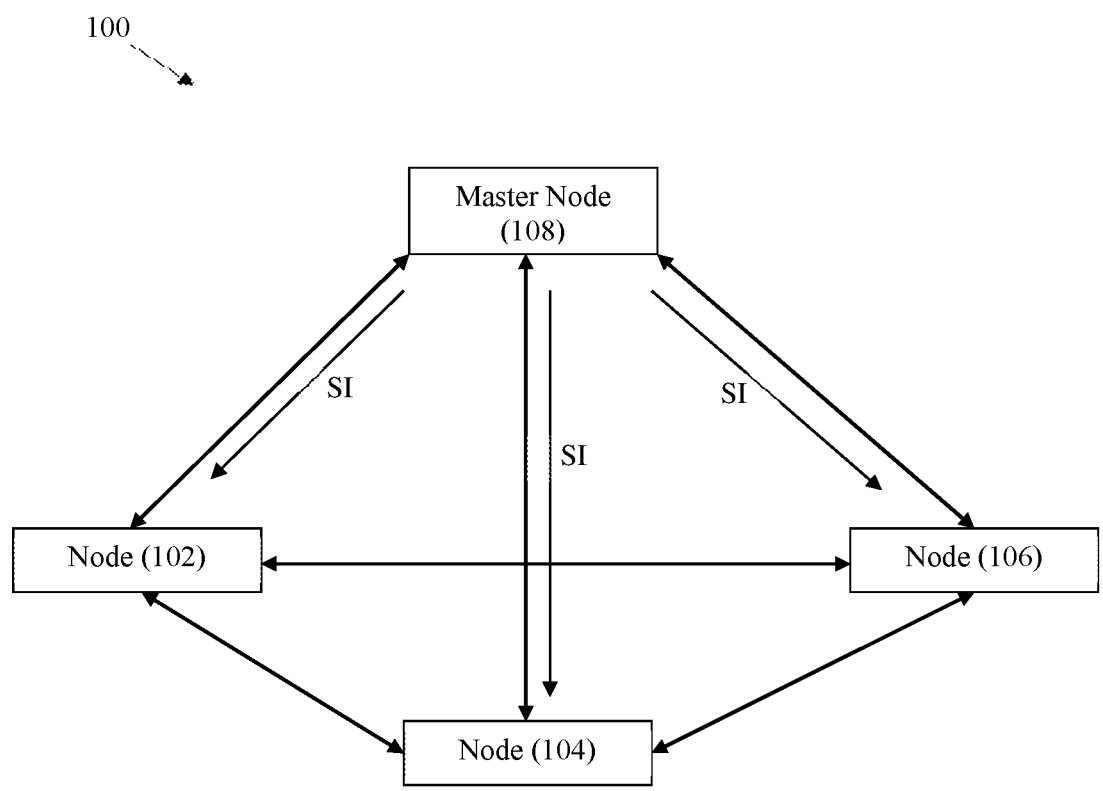
FIG. 1 illustrates a block diagram of a system for adaptively synchronizing learning of multiple learning models, in accordance with an exemplary embodiment of current disclosure.

While using machine learning techniques, data models or learning models are advantageously run on a distributed or decentralized data processing environment. By implementing machine learning technique on the distributed or decentralized data processing environment, multiple local learning models are developed across a group of data processing nodes. Updates from these local learning models are required to be synchronized repeatedly, after certain intervals called synchronization intervals, so that localized learning is shared by all the local data models, and a common learning model can be prepared based on cumulative learning of the local learning models.

Conventional techniques of distributed machine learning utilize static synchronization intervals for synchronizing learnings of local data models that are analyzing a similar dataset. A low synchronization interval (i.e. frequent synchronization) can result in development of a final data model that is highly accurate. However, frequent synchronization requires a large amount of additional time, as synchronization can be compute intensive. Alternatively, using a high synchronization interval (i.e. less frequent synchronization) can result into development of a final data model having a reduced accuracy, with the benefit of a reduction in learning time. Therefore, the synchronization interval is required to be set very carefully to achieve a trade-off between time spent in learning and accuracy of a final data model.

To obtain a highly accurate data model within a lower amount of time, the current invention describes a system and a method of adaptively synchronizing learning of multiple learning models. The method includes running several local learning models on different data processing nodes. Amongst all the data processing nodes, a master node can be elected for supervising level of learning of the remaining data processing nodes, and adaptively synchronizing learning of multiple learning models.

Initially, all the data processing nodes may share their learning model parameters to the master node, in an iterative manner, after a predefined synchronization interval. After expiration of the predefined synchronization interval in each iteration, the master node may aggregate the learning model parameters. Using an aggregated set of learning model parameters derived in each iteration, a respective central learning model per iteration may be generated. Accuracy of the central learning model may be determined. Further, an average accuracy may be determined by averaging the accuracies of consecutive central learning models.

Thereupon, a difference between an accuracy of an immediate central learning model and the average accuracy may be determined. The immediate central learning model may indicate a learning model received after computation of the average accuracy. The difference in accuracy may be compared to a set of thresholds. Based on a deviation of the difference in accuracy from the set of thresholds, the synchronization interval may be modified. The synchronization interval may be modified to obtain highest accuracy of learning in a least amount of time spent in learning, by the local learning models. A modified synchronization interval may be shared with the data processing nodes.

Thereupon, all the data processing nodes will be required to share their respective learning model parameters to the master node at the modified synchronization interval. In this manner, a trade-off can be achieved between time spent in learning and accuracy of a final learning model.

FIG. 1 illustrates a block diagram of a system 100 for adaptively synchronizing learning of multiple learning models. The multiple learning models may run on a plurality of data processing nodes 102, 104, and 106. A master node 108 may be one node elected amongst the plurality of data processing nodes 102, 104, and 106. The master node 108 may be elected based on a suitable leader election algorithm. The leader election algorithm may be designed to operate based on one or more factors, such as processor and memory availability at a node, distance between the nodes, and bandwidth available for communication between the nodes. Further, the master node 108 may update the nodes 102, 104, and 106 about a Synchronization Interval (SI) to be used for sharing their learnings. Details pertaining to functioning of the master node 108 and modification of the Synchronization Interval (SI) is explained in greater detail in subsequent sections.

The nodes 102, 104, and 106 may correspond to different data processing threads of a single processing unit, different processing units of a computing device, or different computing devices. Therefore, the system 100 could be developed over a distributed and/or decentralized environment based on the requirements.

Although FIG. 1 illustrates the nodes 102, 104, and 106 being directly connected to the master node 108 in a star topology, where the master node 108 acting as the central node 108 communicates with the nodes 102, 104, and 106, it is fairly possible to utilize different topologies for establishing communication between the nodes 102, 104, and 106 and the master node 108. Star topology may be utilized in preferred embodiments because the system 100 for adaptively synchronizing learning of multiple learning models will function normally even when one or more nodes amongst the nodes 102, 104, and 106 are malfunctioning. Other topologies for establishing connection between the master node 108 and the nodes 102, 104, and 106 may include a ring topology in which all the nodes are connected in a closed loop, a bus topology in which all the nodes are connected to a common data bus, a hybrid or mesh topology in which all the nodes have data links with multiple neighbouring nodes, and a tree topology in which bottom nodes present at end of the tree communicate with higher nodes, and the higher nodes communicate with yet higher nodes. Thus, the master node 108 may share the SI with the nodes 102, 104, and 106 either directly or through another node, based on the topology used for communication.

Figure 2:
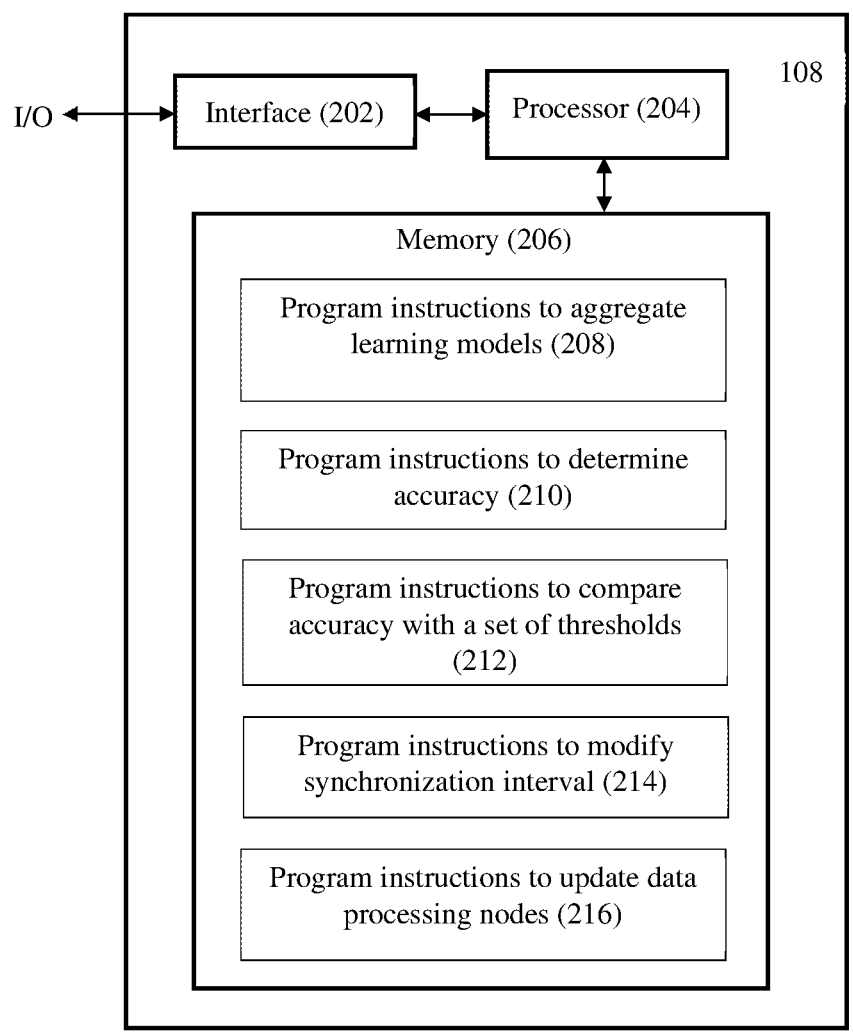
FIG. 2 illustrates a block diagram showing different components present in a master node of the system for adaptively synchronizing learning of multiple learning models, in accordance with an exemplary embodiment of current disclosure.

FIG. 2 illustrates a block diagram showing different components present in the master node 108 of the system 100 for adaptively synchronizing learning of multiple learning models. The master node 108 may comprise an interface 202, a processor 204, and a memory 206. The memory 206 may store program instructions for performing several functions through which learning of multiple learning models could be adaptively synchronized, by the master node 108. A few such program instructions stored in the memory 206 includes program instruction to aggregate learning model parameters 208, program instructions to determine accuracy 210, program instructions to compare accuracy with a set of thresholds 212, program instructions to modify synchronization interval 214, and program instructions to update data processing nodes 216.

The program instruction to aggregate learning model parameters 208 may cause the processor 204 to aggregate the learning model parameters received from the nodes 102, 104, and 106. The learning model parameters may be received after a predefined synchronization interval, and for a predetermined number of iterations. Further, central learning models may be generated based on the aggregated set of learning model parameters received after each of the predefined number of iterations. The program instruction to determine accuracy 210 may cause the processor 204 to determine accuracies of the central learning models and successively determine an average accuracy by averaging the accuracies of the central learning models. The program instruction to determine accuracy 210 may further cause the processor 204 to determine a difference between an accuracy of an immediate central learning model and the average accuracy, and update an accuracy metric based on the difference between the accuracy of the immediate central model and the average accuracy.

The program instructions to compare accuracy with a set of thresholds 212 may cause the processor 204 to compare the accuracy metric to a range established by a set of thresholds. The program instructions to modify synchronization interval 214 may cause the processor 204 to modify the predefined synchronization interval, when the accuracy metric is outside of the range established by the set of thresholds. In one case, the synchronization interval may be down-scaled by a predefined scaling factor when the accuracy metric falls below the range established by the set of thresholds. In another case, the synchronization interval may be up-scaled by the predefined scaling factor when the accuracy metric exceeds the range established by the set of thresholds. The program instructions to update data processing nodes 216 may cause the processor 204 to transmit the modified synchronization interval to the nodes 102, 104, and 106. The modified synchronization interval may be shared to the nodes 102, 104, and 106 based on a topology of communication between the nodes 102, 104, and 106 and the master node 108. Detailed functioning of such program instructions will become evident upon reading the details provided successively.

Figure 3:
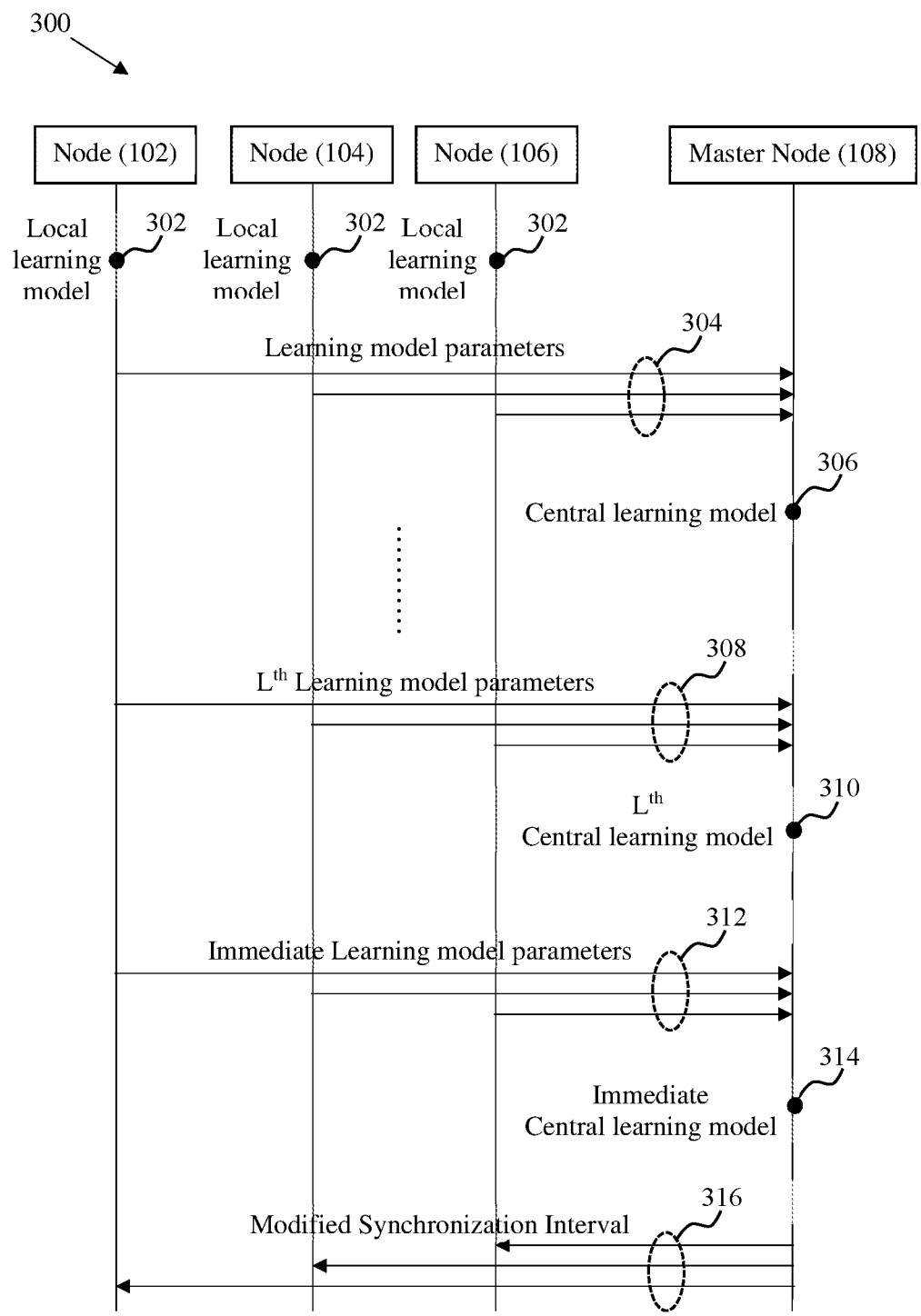
FIG. 3 illustrates a data flow diagram, in accordance with an exemplary embodiment of current disclosure.

Referring to FIG. 3 illustrating a data flow diagram 300, functioning of a system configured to adaptively synchronize learning of multiple data models is now described. Initially, at instance 302, a plurality of data processing nodes i.e. nodes 102, 104, and 106 may run local learning models on them, to learn upon similar data. The nodes 102, 104, and 106 may run the local learning models until expiry of a predefined synchronization interval. In one case, the predefined synchronization interval may be represented as "sstart" and may be stored in the master node 108. The predefined synchronization interval (sstart) may be an arbitrarily high value, for example any value that is sufficiently greater than 1. Thus, it could be considered that sstart>>1.

After expiry of the predefined synchronization interval, the nodes 102, 104, and 106 may share their respective learning model parameters to the master node 108, at instance 304. In one case, the learning model parameters may be weights indicating a level of learning achieved by the nodes 102, 104, and 106. The master node 108 may aggregate a set of the learning model parameters received from the nodes 102, 104, and 106. Using an aggregated set of learning model parameters, the master node 108 may generate a central learning model, at instance 306.

The master node 108 may determine accuracy of the central learning model. The accuracy of the central learning model may be determined by implementing the central learning model on predefined data. The predefined data may indicate pre-stored evaluation data used to determine accuracy of the central learning model in identifying the predefined data. An output obtained by implementation of the central learning model on the predefined data may be compared with a standard known output to determine the accuracy of the central learning model.

In one implementation, the accuracy may be represented as Mean Squared Errors (MSEs). To determine MSE, an inferred label may be determined for a sample present in the predefined data. The inferred label may be determined using the central learning model. Successively, a difference between the inferred label and an actual label of the sample may be determined, and such difference may be identified as an error. Similarly, errors may be determined for remaining samples present in the predefined data. All such errors may be squared, added, and averaged to obtain the MSE.

In one embodiment, the process of generating central learning models using the learning model parameters obtained from the nodes 102, 104, and 106, and determining accuracy of the central learning models may be performed for a predefined number of iterations, for example 'L' iterations. Thus, in iteration 'L', the master node 108 may receive $L^{th}$ learning model parameters from the nodes 102, 104, and 106, at instance 308. The master node 108 may aggregate a set of the $L^{th}$ learning model parameters received from the nodes 102, 104, and 106. Using an $L^{th}$ aggregated set of learning model parameters, the master node 108 may generate an $L^{th}$ central learning model, at instance 310. The master node 108 may then determine accuracy of the $L^{th}$ central learning model. The accuracy of the $L^{th}$ central learning model may be determined by implementing the $L^{th}$ central learning model on the predefined data.

The master node 108 may determine an average accuracy by averaging the accuracies of the central learning models derived in L iterations. Thereupon, the master node 108 may obtain immediate learning model parameters from the nodes 102, 104, and 106, at instance 312. The immediate learning model parameters may indicate the learning model parameters received after determining the average accuracy. The master node 108 may then aggregate the immediate learning model parameters, and generate an immediate central learning model from aggregated set of the immediate learning model parameters, at instance 314. The master node 108 may then determine accuracy of the immediate central learning model. The accuracy of the immediate central learning model may be determined by implementing the immediate central learning model on the predefined data.

Post determining the average accuracy and the accuracy of the immediate central learning model, the master node 108 may determine a difference between the accuracy of the immediate central learning model and the average accuracy. In one case, an accuracy metric maintained at the master node 108 may be updated to store the difference between the accuracy of the immediate central model and the average accuracy.

In one embodiment, to determine a current performance of the learning models developed at the nodes 102, 104, and 106, the master node 108 may compare the accuracy metric to a range established by a set of thresholds. The set of thresholds may include a predefined minimum acceptable level of accuracy and a predefined sufficiently acceptable level of accuracy. When the accuracy metric is identified to be present outside of the range established by the set of thresholds, the master node 108 may modify the predefined synchronization interval after which the nodes 102, 104, and 106 are required to share their learning model parameters to the master node 108. The master node 108 may update the nodes 102, 104, and 106 about such modified synchronization interval, at instance 316. Henceforth, the nodes 102, 104, and 106 will be required to share their learning model parameters with the master node 108 after such modified synchronization interval, until a further modified synchronization interval is shared with the nodes 102, 104, and 106.

In one scenario, the accuracy metric may be identified to comprise a value lesser than the predefined minimum acceptable level of accuracy. It may indicate that the local learning models running at the nodes 102, 104, and 106 are not learning adequately. In such scenario, the predefined synchronization interval may be down-scaled by a predefined scaling factor. Downscaling of the predefined synchronization interval would result in frequent sharing of the learning model parameters by the nodes 102, 104, and 106 to the master node 108. Frequent sharing of the learning model parameters by the nodes 102, 104, and 106 would lead to frequent synchronization of the learning model parameters by the master node 108, to maintain a common level of learning between all the local learning models. In this manner, accuracy of the local learning models could be improved.

In another scenario, the accuracy metric may be identified to comprise a value greater than the predefined sufficiently acceptable level of accuracy. It may indicate that the local learning models running at the nodes 102, 104, and 106 are learning too well, and this could result in an overfitting problem. In such scenario, the predefined synchronization interval may be up-scaled by a predefined scaling factor. It must be understood that the predefined scaling factor used for downscaling the predefined synchronization interval and the predefined scaling factor used for up-scaling the predefined synchronization interval may be similar or different. Upscaling of the predefined synchronization interval would result in less frequent sharing of the learning model parameters by the nodes 102, 104, and 106 to the master node 108. Less frequent sharing of the learning model parameters by the nodes 102, 104, and 106 would lead to less frequent synchronization of the learning model parameters by the master node 108, resulting in reduction of time overhead required in synchronization of the learning model parameters. In this manner, an overall time required for training the local learning models could be reduced.

In yet another scenario, the accuracy metric may be identified to comprise a value falling between the predefined minimum acceptable level of accuracy and the predefined sufficiently acceptable level of accuracy. It may indicate that the local learning models running at the nodes 102, 104, and 106 are learning sufficiently well. In such scenario, the predefined synchronization interval may not be modified, and the nodes 102, 104, and 106 may continue to share the learning model parameters at the predefined synchronization interval.

Figure 4:
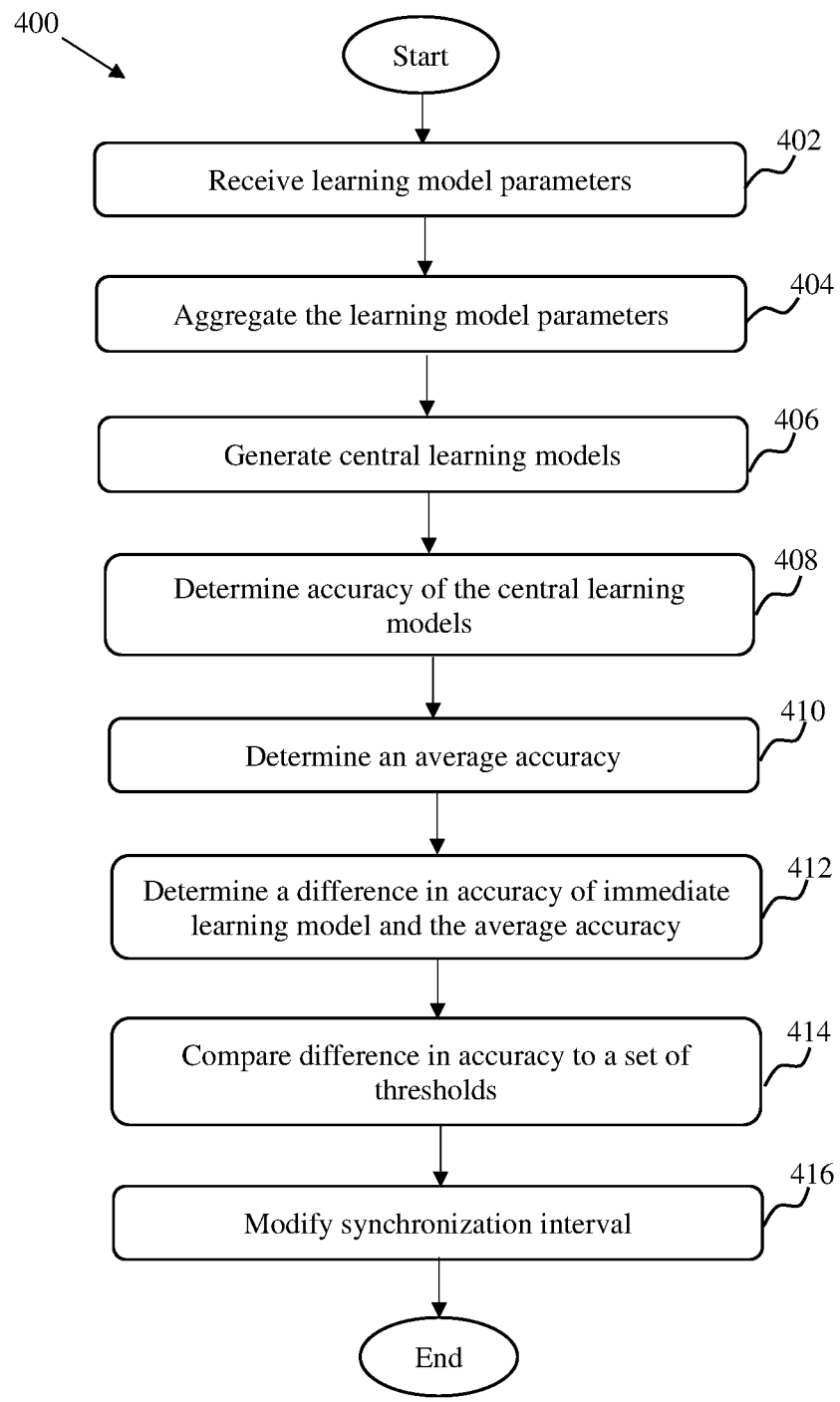
FIG. 4 illustrates an exemplary flowchart of a method for adaptively synchronizing learning of multiple learning models, in accordance with an exemplary embodiment of current disclosure.

Referring now to FIG. 4, a method of adaptively synchronizing learning of multiple learning models is described, with reference to flowchart 400. In this regard, each block may represent a module, segment, or portion of code, which comprises one or more executable instructions for implementing the specified logical function(s). It should also be noted that in some alternative implementations, the functions noted in the blocks may occur out of the order noted in the drawings. For example, two blocks shown in succession in FIG. 4 may in fact be executed substantially concurrently or the blocks may sometimes be executed in the reverse order, depending upon the functionality involved. Any process descriptions or blocks in flow charts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as decisions made by the program instructions 208 through 216.

At block 402, a master node may receive learning model parameters from data processing nodes running local learning models, to identify common data. The data processing nodes may run the local learning models until expiry of a predefined synchronization interval, in an iterative manner. The predefined synchronization interval that may have an arbitrarily high value, for example any value sufficiently greater than 1. In one case, the learning model parameters may be weights indicating a level of learning achieved by the data processing nodes.

At block 404, the master node may aggregate the learning model parameters after each iteration. For example, when the learning model parameters exist as weights, aggregation of the learning model parameters would indicate addition of the weights. Thus, the weights received from the data processing nodes after one iteration may be added, and an average value of such sum may be determined. Similarly, weights received from the data processing nodes in successive iterations may be added and averaged. The average values of the weights determined in multiple iterations may denote an aggregated set of learning model parameters.

At block 406, the master node may generate central learning models using the aggregated set of learning model parameters received after each iteration. The central learning models may indicate learnings developed by the data processing nodes in each of the iterations. Analysis of such learnings may help in identifying the trend of learning of the data processing nodes. Specifically, improvement or decline in learning of the data processing nodes over a period of time may be identified by analysing the central learning models.

At block 408, the master node may determine accuracies of the central learning models. In one implementation, the accuracies of the central learning models may be determined by implementing the central learning models on predefined data. The predefined data may indicate pre-stored evaluation data used to determine accuracies of the central learning models in identifying the predefined data. An output obtained by implementation of the central learning models on the predefined data may be compared with a standard known output to determine the accuracies of the central learning model. Further, the accuracies may be represented as Mean Squared Errors (MSEs), in one instance.

At block 410, the master node may determine an average accuracy by averaging the accuracies of the central learning models. Successively, the master node may obtain immediate learning model parameters from the data processing nodes. The immediate learning model parameters may indicate the learning model parameters received after determining the average accuracy. Upon receiving, the master node may aggregate the immediate learning model parameters, and generate an immediate central learning model from aggregated set of the immediate learning model parameters. The master node may then determine accuracy of the immediate central learning model. The accuracy of the immediate central learning model may be determined by implementing the immediate central learning model on the predefined data.

At block 412, the master node may determine a difference between the accuracy of the immediate central learning model and the average accuracy. In one case, an accuracy metric maintained at the master node may be updated to store the difference between the accuracy of the immediate central model and the average accuracy.

At block 414, the master node may compare the accuracy metric to a range established by a set of thresholds. Such comparison may be made to determine a current performance of the learning models developed at the data processing nodes. The set of thresholds may include a predefined minimum acceptable level of accuracy and a predefined sufficiently acceptable level of accuracy.

At block 416, based on comparison of the accuracy metric to the range established by a set of thresholds, the master node may modify the predefined synchronization interval to obtain a modified synchronization interval. In one case, when the accuracy metric comprises a value lesser than the range established by a set of thresholds, the predefined synchronization interval may be down-scaled by a predefined scaling factor, to increase a frequency of synchronization of the local learning models. In another case, when the accuracy metric comprises a value higher than the range established by a set of thresholds, the predefined synchronization interval may be up-scaled by a predefined scaling factor, to reduce the frequency of synchronization of the local learning models. In yet another case, when the accuracy metric comprises a value falling between the range established by a set of thresholds, the predefined synchronization interval may not be modified, to continue synchronization of the local learning models at the predefined synchronization interval.

Figure 5:
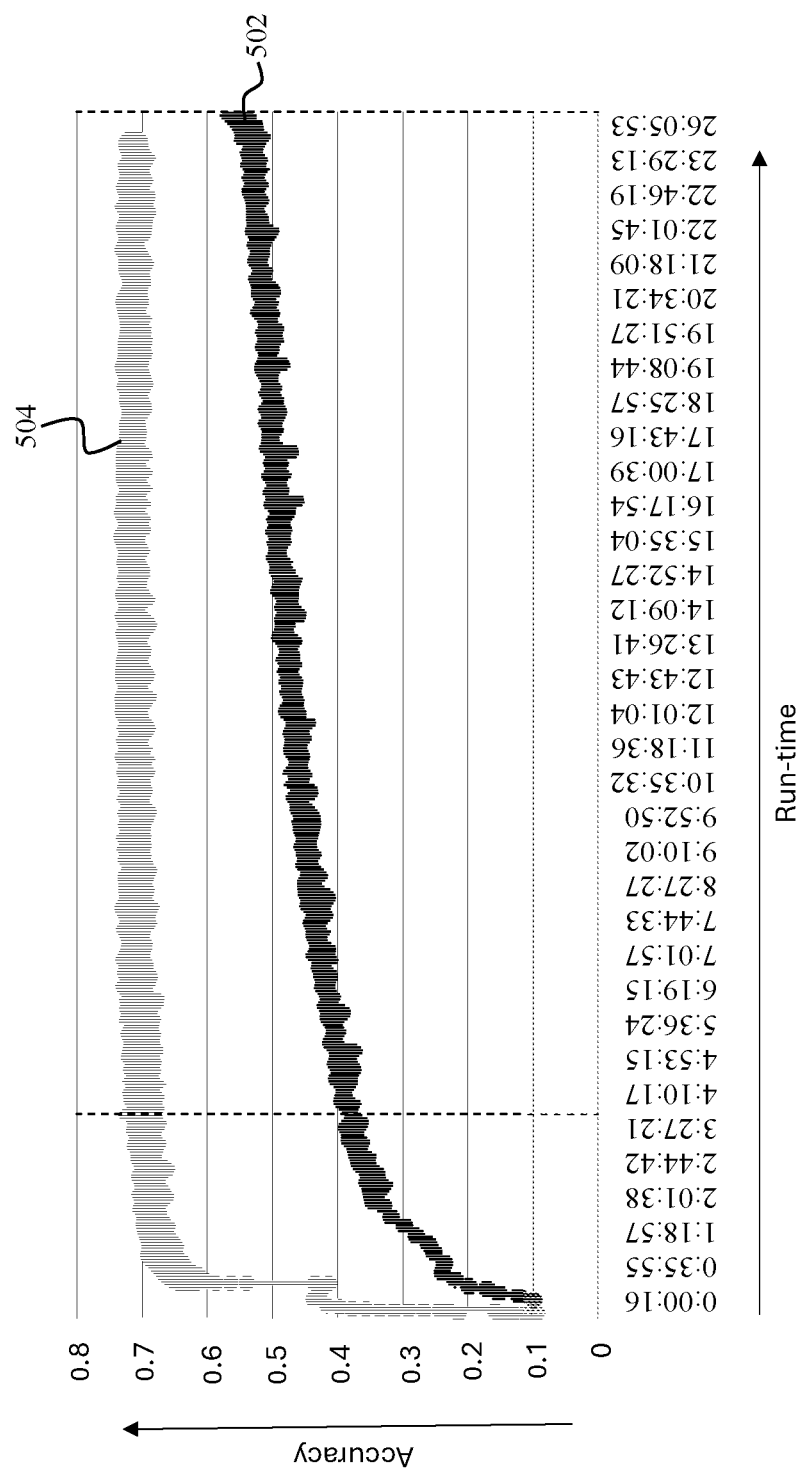
FIG. 5 illustrates comparison of test results obtained using conventional batch based synchronization and proposed adaptive synchronization of learning models, in accordance with an exemplary embodiment of current disclosure.

FIG. 5 illustrates comparison of test results obtained using conventional batch based synchronization and proposed adaptive synchronization of learning models. The conventional batch based synchronization involved synchronization of learning between the nodes after each training batch. In one test scenario, a Convolutional Neural Network (CNN) model was trained using Swarm Learning Framework (SLF) on a standard Canadian Institute For Advanced Research (CIFAR-10) dataset. The CIFAR-10 dataset included a labelled collection of 60,000 images present across 10 categories.

In one implementation, the CIFAR-10 dataset was divided among 2 nodes viz. a first node and a second node. The CIFAR-10 dataset was divided in a biased fashion so that both nodes i.e. the first node and the second node could learn from each other. The first node hosted image with labels 1-5, and the second node contained images with labels 6-10. The CIFAR-10 dataset was analyzed separately using conventional batch based synchronization and proposed adaptive synchronization of learning models, and the test results were compared. The test results included progression of training accuracy developed over run-time.

Within FIG. 5, learning curve 502 is plotted to illustrate results obtained upon synchronization of learning models performed using conventional batch based synchronization. Further, learning curve 504 is plotted to illustrate results obtained upon synchronization of learning models performed using proposed adaptive synchronization. In an exemplary scenario, for performing synchronization of learning models using proposed adaptive synchronization, following values were used for different parameters. The predefined synchronization interval was set as 10000, number of iterations for which observation needs to be performed was set as 10, the scaling factor was set as 1.1, the minimum acceptable improvement in loss was set as 0.01, and the sufficiently acceptable improvement in loss was set as 0.04.

It could be observed from FIG. 5 that an accuracy of up to 58% was achieved in a time span of about 26 hours, using the conventional batch based synchronization. On the other hand, using the proposed adaptive synchronization, an accuracy of about 45% was obtained in a fraction of time. Subsequently, the synchronization interval was adjust to such a value that an accuracy of above 72% was achieved within a time span of about 4 hours. Thus, compared to usage of the conventional batch based synchronization, usage of the proposed adaptive synchronization provides achievement of better accuracy of learning models within a very short amount of time.

An interface may be used to provide input or fetch output from a master node. An interface may be implemented as a Command Line Interface (CLI), Graphical User Interface (GUI). Further, Application Programming Interfaces (APIs) may also be used for remotely interacting with a master node.

A processor may include one or more general purpose processors (e.g., INTEL® or Advanced Micro Devices® (AMD) microprocessors) and/or one or more special purpose processors (e.g., digital signal processors or Xilinx® System On Chip (SOC) Field Programmable Gate Array (FPGA) processor), MIPS/ARM-class processor, a microprocessor, a digital signal processor, an application specific integrated circuit, a microcontroller, a state machine, or any type of programmable logic array.

A memory may include, but may not be limited to, non-transitory machine-readable storage devices such as hard drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs). Erasable PROMs (EPROMs), Electrically Erasable PROMs (EEPROMs), flash memory, magnetic or optical cards, or other type of media/machine-readable medium suitable for storing electronic instructions.

In above described embodiments, the words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

An embodiment of the invention may be an article of manufacture in which a machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components. Also, although the discussion focuses on uplink medium control with respect to frame aggregation, it is contemplated that control of other types of messages are applicable.

Any combination of the above features and functionalities may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

We claim:
1. A system, comprising:
    a memory;
    a processor that is configured to execute machine readable instructions stored in the memory to transmit communications between a plurality of data processing nodes and a master node;
    the plurality of data processing nodes programmed to run a plurality of local learning models; and
    the master node programmed to communicate with the plurality of data processing nodes to:
        iteratively receive, by the master node over a predefined synchronization interval, a set of learning model weights from the plurality of data processing nodes, wherein the predefined synchronization interval is stored as an integer value at the master node;
        aggregate, by the master node, the set of learning model weights received iteratively from the plurality of data processing nodes, after a predefined synchronization interval, wherein the set of learning model weights are received for a predefined number of iterations;
        generate central learning models based on the aggregated set of learning model weights received after each of the predefined number of iterations;
        generate an average accuracy value associated with the central learning models;
        determine a difference between an accuracy of a central learning model and the average accuracy value;
        update an accuracy metric based on the difference between the accuracy of the central model and the average accuracy value;
        compare the accuracy metric to a range established by a set of thresholds; and
        when the accuracy metric is outside of the range established by the set of thresholds, downscale, in accordance with the integer value, the predefined synchronization interval by a predefined scaling factor that increases sharing of the set of learning model weights by the data processing nodes.

2. The system of claim 1, wherein the accuracy metric is represented as Mean Squared Errors (MSEs).

3. The system of claim 1, wherein the average accuracy value associated with the central learning models and the accuracy of the central learning model are determined based on results obtained by implementation of the central learning models and the central learning model on pre-stored evaluation data.

4. The system of claim 1, wherein the predefined synchronization interval is up-scaled by the predefined scaling factor when the accuracy metric exceeds the range established by the set of thresholds.

5. The system of claim 1, wherein the master node and the plurality of data processing nodes are a part of a decentralized data processing network or a distributed data processing network.

6. A method, comprising:
    periodically receiving, at a master node of a plurality of data processing nodes, a set of learning model weights from each node of the plurality of data processing nodes,
        wherein the each successive set of learning model weights from the respective nodes are iteratively received after a predefined synchronization interval, wherein the predefined synchronization interval is stored as an integer value at the master node, and wherein the set of learning model weights are received for a predefined number of iterations;
    aggregating, after each of the predefined number of iterations, the set of learning model weights received after the predefined synchronization interval;

generating central learning models based on the aggregated set of learning model weights received after each of the predefined number of iterations;

generating an average accuracy value associated with the central learning models;

determining a difference between an accuracy of a central learning model and the average accuracy value;

comparing the difference in accuracy to a set of thresholds;

when the difference in accuracy is outside of a range established by the set of thresholds, downscaling, in accordance with the integer value, the predefined synchronization interval by a predefined scaling factor that increases sharing of the set of learning model weights by the data processing nodes modifying the predefined synchronization interval; and transmitting, to the plurality of data processing nodes, the modified synchronization interval.

7. The method of claim 6, wherein the accuracy is represented as Mean Squared Errors (MSEs).

8. The method of claim 6, wherein the average accuracy value associated with the central learning models and the accuracy of the central learning model are determined based on results obtained by implementation of the central learning models and the central learning model on pre-stored evaluation data.

9. The method of claim 6, wherein the predefined synchronization interval is modified by the master node elected amongst the plurality of data processing nodes.

10. The method of claim 6, wherein the synchronization interval is up-scaled by the predefined scaling factor when the difference in accuracy exceeds the range established by the set of thresholds.

11. The method of claim 6, wherein the master node and the plurality of data processing nodes are a part of a decentralized data processing network or a distributed data processing network.

12. A non-transitory machine-readable storage medium that stores instructions which, when executed by a processor, perform a plurality of operations comprising:

receiving a set of learning model weights iteratively from each node of a plurality of data processing nodes, wherein the set of learning model weights is received after a predefined synchronization interval, wherein the predefined synchronization interval is stored as an integer value at the master node, and wherein the set of learning model weights are received for a predefined number of iterations;

generating central learning models based on the set of learning model weights received after each of the predefined number of iterations;

generating an average accuracy value associated with the central learning models;

determining a difference between an accuracy of a central learning model and the average accuracy value;

comparing the difference in accuracy to a range established by a set of thresholds;

when the difference in accuracy is outside of the range, downscaling, in accordance with the integer value, the predefined synchronization interval by a predefined scaling factor that increases sharing of the set of learning model weights by the data processing nodes; and transmitting, to the plurality of data processing nodes, the modified predefined synchronization interval.

13. The system of claim 1, wherein the set of learning model weights indicate a level of learning achieved by the plurality of data processing nodes.

14. The system of claim 1, wherein the master node is further programmed to:

receive pre-stored evaluation data;

generate, using the central learning model, an inferred label of the pre-stored evaluation data; and store the inferred label of the pre-stored evaluation data with the master node.

15. The system of claim 1, wherein the master node is further programmed to:

identify common data in the set of learning model weights.

16. The system of claim 1, wherein the master node is further programmed to:

adjust the predefined synchronization interval by the predefined scaling factor to reduce a frequency of synchronization of the plurality of local learning models with the master node.

17. The system of claim 1, wherein the master node is further programmed to:

plot a learning curve that illustrates results obtained upon synchronization of the set of learning models.

18. The system of claim 1, wherein the plurality of data processing nodes use an Application Programming Interface (API) to communicate with the master node.

19. The system of claim 1, wherein the set of learning model weights is averaged and aggregated by the master node.

20. The system of claim 1, wherein the master node is further programmed to:

determine that the predefined synchronization interval has expired for the iteration; and in response to the predefined synchronization interval expiring, trigger the aggregation and averaging of the set of learning model weights.

* * * * *